(12) United States Patent
Newlin et al.

(10) Patent No.: US 9,689,693 B2
(45) Date of Patent: Jun. 27, 2017

(54) SYSTEMS AND METHODS FOR LEARNING AND DISPLAYING CUSTOMIZED GEOGRAPHICAL NAVIGATIONAL OPTIONS

(71) Applicant: MapQuest, Inc., Denver, CO (US)

(72) Inventors: Meghan Newlin, Boulder, CO (US); Cristian J. Whitney, Denver, CO (US); Austin Brown, Denver, CO (US); Kent Dennis Hollrah, Denver, CO (US); Lindsay E. Moore, Erie, CO (US)

(73) Assignee: Mapquest, Inc., Denver, CO (US)

( * ) Notice: Subject to any disclaimer, the term of this patent is extended or adjusted under 35 U.S.C. 154(b) by 0 days.

(21) Appl. No.: 14/682,806

(22) Filed: Apr. 9, 2015

(65) Prior Publication Data

US 2016/0298974 A1 Oct. 13, 2016

(51) Int. Cl.
*G01C 21/34* (2006.01)
*G06Q 10/02* (2012.01)
*G08G 1/01* (2006.01)
*G08G 1/123* (2006.01)

(52) U.S. Cl.
CPC ......... *G01C 21/3423* (2013.01); *G01C 21/34* (2013.01); *G06Q 10/025* (2013.01); *G08G 1/0104* (2013.01); *G08G 1/0129* (2013.01); *G08G 1/0141* (2013.01); *G08G 1/123* (2013.01)

(58) Field of Classification Search
CPC .. G06Q 10/025; G08G 1/0104; G08G 1/0141; G08G 1/0129; G08G 1/123; G01C 21/34; G01C 21/3423
See application file for complete search history.

(56) References Cited

U.S. PATENT DOCUMENTS

| | | | | |
|---|---|---|---|---|
| 6,209,026 B1 * | 3/2001 | Ran | ...................... | G06Q 10/047 702/3 |
| 6,317,686 B1 * | 11/2001 | Ran | .................... | G01C 21/3691 701/414 |
| 7,363,319 B2 * | 4/2008 | Cappellini | ........... | G06Q 10/025 |
| RE42,001 E * | 12/2010 | O'Brien | ............... | G06Q 10/025 705/6 |
| 7,921,022 B2 * | 4/2011 | de Marcken | ......... | G06Q 10/025 705/5 |
| 7,925,540 B1 * | 4/2011 | Orttung | ................ | G06Q 10/109 705/1.1 |
| 9,076,330 B2 * | 7/2015 | Bouillet | ............... | G06Q 10/025 |
| 9,183,941 B2 * | 11/2015 | Vanalli | .................... | G11C 11/00 |

(Continued)

*Primary Examiner* — Dale W Hilgendorf

(57) ABSTRACT

Systems and methods are disclosed for generating and displaying a comparison of multiple modes of transportation for reaching a destination. One method includes receiving, for a user over an electronic network, log-in information, one or more transportation preferences and a destination; identifying a subset of available modes of transportation to the destination; determining a time, distance, and cost associated with traveling to the destination using each available mode; identify a further subset of acceptable modes by comparing the determined time, distance and cost of each available mode against one or more of the user's preferences, the user's history, a date and time, one or more assumption, and a mode total weighting; and identifying at least one option for traveling to the destination using each acceptable mode.

17 Claims, 7 Drawing Sheets

(56) References Cited

U.S. PATENT DOCUMENTS

| | | | | |
|---|---|---|---|---|
| 2010/0305984 A1* | 12/2010 | Ben-Yitschak | ...... | G06Q 10/025 705/6 |
| 2011/0022428 A1* | 1/2011 | Parker | ......... | G06Q 10/025 705/6 |
| 2012/0330698 A2* | 12/2012 | Gilliam | ............ | G06Q 10/025 705/6 |
| 2013/0325315 A1* | 12/2013 | Beaurepaire | ....... | G01C 21/3423 701/400 |
| 2014/0114705 A1* | 4/2014 | Bashvitz | ............ | G06Q 10/047 705/5 |
| 2014/0257697 A1* | 9/2014 | Gishen | ............. | G01C 21/3438 701/537 |

* cited by examiner

SYSTEMS AND METHODS FOR LEARNING AND DISPLAYING CUSTOMIZED GEOGRAPHICAL NAVIGATIONAL OPTIONS

TECHNICAL FIELD

The present disclosure relates generally to determining and displaying available modes of transportation for navigating geographical routes and, more particularly, to learning and determining which modes of transportation to display to display for a particular user, as well as, a sequence for displaying those modes.

BACKGROUND

In order to provide travelers or commuters with information related to a navigation route, traditional mapping services calculate routes using preset methods based on known mapping information, such as point-of-interest (POI) locations, road locations, and physical distances between locations and nearby connected roads. Typical mapping systems generate only walking, biking, or driving directions using that mapping information. Users generally have to rely on separate applications to view data related to third party operated modes of transportation, such as public transportation and application-initiated third-party transportation. To date, users have no way to easily compare multiple modes of transportation, at one time, in one screen and/or one client application, not to mention the various costs, times, estimated time of arrivals (ETAs), and many other factors associated with selecting between those multiple modes of transportation.

Accordingly, a need exists for systems and methods for generating and displaying information related to multiple, alternative modes of transportation from an origin to a destination. Moreover, with numerous modes of transportation available for a user to select, a user may be overwhelmed by a long list of transportation modes, many of which may be irrelevant or unsuitable for a given user, time, or trip. Accordingly, a need exists for systems and methods for determining acceptable modes of transportation to display to a user, and a sequence in which to display these modes of transportation.

SUMMARY OF THE DISCLOSURE

Embodiments of the present disclosure include systems and methods for determining acceptable modes of transportation for a user, and a sequence in which to display those acceptable modes of transportation to the user, for use by the user as a comparison tool. Specifically, systems and methods are disclosed for displaying acceptable modes of transportation based on a variety of assumed, learned, and/or user-confirmed rules/factors, in some cases based on diverse sources of transportation data received in relation to numerous available modes of transportation.

According to certain embodiments, methods are disclosed for determining modes of transportation for display. One method includes receiving, for a user over an electronic network, log-in information, one or more transportation preferences and a destination; identifying a subset of available modes of transportation to the destination; determining a time, distance, and cost associated with traveling to the destination using each available mode; identifying a further subset of acceptable modes by comparing the determined time, distance and cost of each available mode against one or more of the user's preferences, the user's history, a date and time, one or more assumption, and a mode total weighting; and identifying at least one option for traveling to the destination using each acceptable mode.

According to certain embodiments, systems are disclosed for determining modes of transportation to display. One system includes a data storage device storing instructions; and a processor configured to execute the instructions to perform a method including: receiving, for a user over an electronic network, log-in information, one or more transportation preferences and a destination; identifying a subset of available modes of transportation to the destination; determining a time, distance, and cost associated with traveling to the destination using each available mode; identifying a further subset of acceptable modes by comparing the determined time, distance and cost of each available mode against one or more of the user's preferences, the user's history, a date and time, one or more assumption, and a mode total weighting; and identifying at least one option for traveling to the destination using each acceptable mode.

According to certain embodiments, a computer readable medium is disclosed storing instructions that, when executed by a computer, cause the computer to perform a method, the method comprising: receiving, for a user over an electronic network, log-in information, one or more transportation preferences and a destination; identifying a subset of available modes of transportation to the destination; determining a time, distance, and cost associated with traveling to the destination using each available mode; identifying a further subset of acceptable modes by comparing the determined time, distance and cost of each available mode against one or more of the user's preferences, the user's history, a date and time, one or more assumption, and a mode total weighting; and identifying at least one option for traveling to the destination using each acceptable mode.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

The present disclosure is directed to overcoming one or more of the above referenced issues and relates generally to improving user interaction with a navigation system, such as by generating and displaying data related to multiple modes of transportation for traveling from a start location to a destination location.

The present disclosure includes integrating multiple modes of transportation into a navigation application and using various rules to determine which modes of transportation are displayed to the user, and the order in which the modes are displayed. These rules may be assumed, learned, or obtained directly from the user via, e.g., a survey or preferences. These rules may relate to distance, time of day, weather, geographic location, etc. For example, if the user never takes public transportation when it is raining, the application may "learn" to suggest driving directions when the weather indicates rain. Alternatively, the user can either initiate or respond to prompts to provide preferences, such as "Don't show me walking options after 8 p.m.," or "I won't take the bus when it's raining, but I'll take the metro." As a result, based on explicit user preferences and/or learned preferences, a server may determine which modes of public and/or private transportation to recommend, and optimally what order to display them.

In one example, a method of determining the transportation modes to display and their order is disclosed and may include any number of steps. These steps may include narrowing modes of transportation into subsets (e.g., available modes and/or acceptable modes). A variety of sources of information and/or positive or negative weights may then be used in one or more subroutines of an analysis server to output (1) a total weight for one or more modes, (2) a subset of modes for display, and/or (3) a sequence of modes to display.

Figure 1:
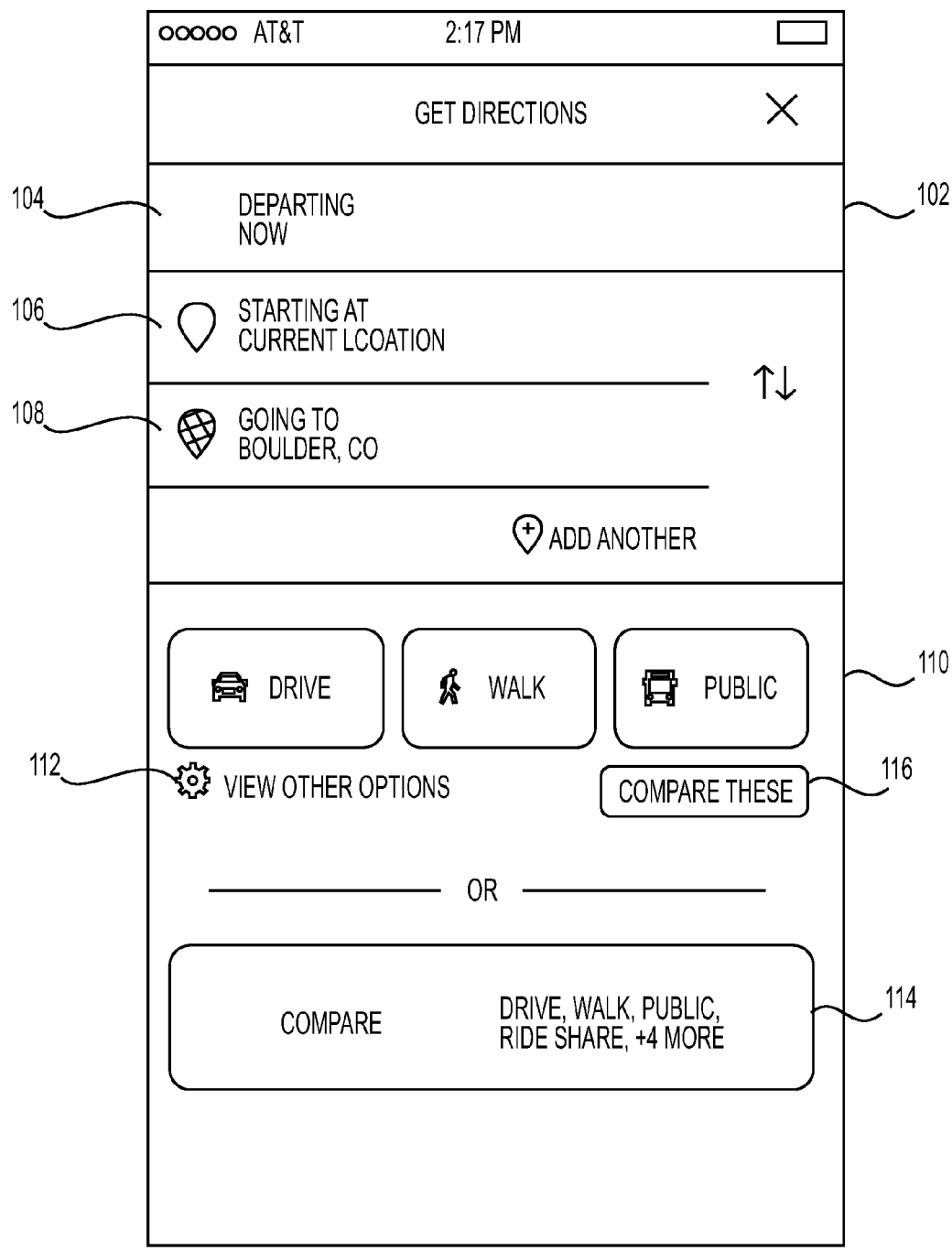
FIG. 1 is a schematic view of an exemplary graphical user interface ("GUI") for user input related to desired travel and available modes of transportation for selection or for comparison, according to an exemplary embodiment of the present disclosure.

Referring now to the figures, FIG. 1 illustrates an exemplary GUI for a display that may provide one way for a user to request directions from one location to another. The GUI of FIG. 1 may include route information section 102, quick directions section 110, "View Other Options" icon 112, "Compare These" icon 116, and/or "Compare More" icon 114. Route information section 102 may include time of departure 104, starting location 106, and/or destination location 108. A user may set the time of departure section 104 to the current time or any time in the future. A default setting may be set for the time of departure section 104. In some examples, the default setting for the time of departure may be the current time, the next 5, 10, or 15 minute increment, and/or a common time for this or other users to request directions (e.g., setting the time of departure from a downtown location to 6:15 p.m. because this user often leaves downtown at 6:15 p.m.). Starting location 106 may include the current location, as shown in FIG. 1, or an address, POI, or intersection input by the user. Similarly, a destination location 108 may be an address, POI, or intersection input by the user. In some examples, a user may set multiple stops and/or destinations.

The quick directions section 110 may include any number and/or combination of transportation modes available for selection. In some examples, the modes of transportation displayed and/or the order of display may vary depending upon a variety of factors, weights, and/or rules, as further described below with respect to FIGS. 4 and 5. In some examples, the modes and/or the order are random, preset, and/or designated by the user. Selecting the "View Other Options" icon 112 may provide the user with customization options for the quick directions section 110.

In the example illustrated in FIG. 1, the modes of transportation available in the quick directions section 110 may include driving, walking, or taking public transportation. In examples in which an application developer sets the modes of transportation in the quick directions section 110, the application developer may use any criteria. In some examples, an application developer may receive compensation for adding a partner's services (e.g., a specific car share company) and the quick directions section 110 may be initially set with that partner's icon. Selecting the "Compare These" icon 116 may result in a GUI displaying at least one option of each of the modes of transportation currently displayed in quick directions section 110. Quick directions section 110 of the GUI illustrated in FIG. 1 is exemplary and may include any number of modes of transportation.

Figure 2:
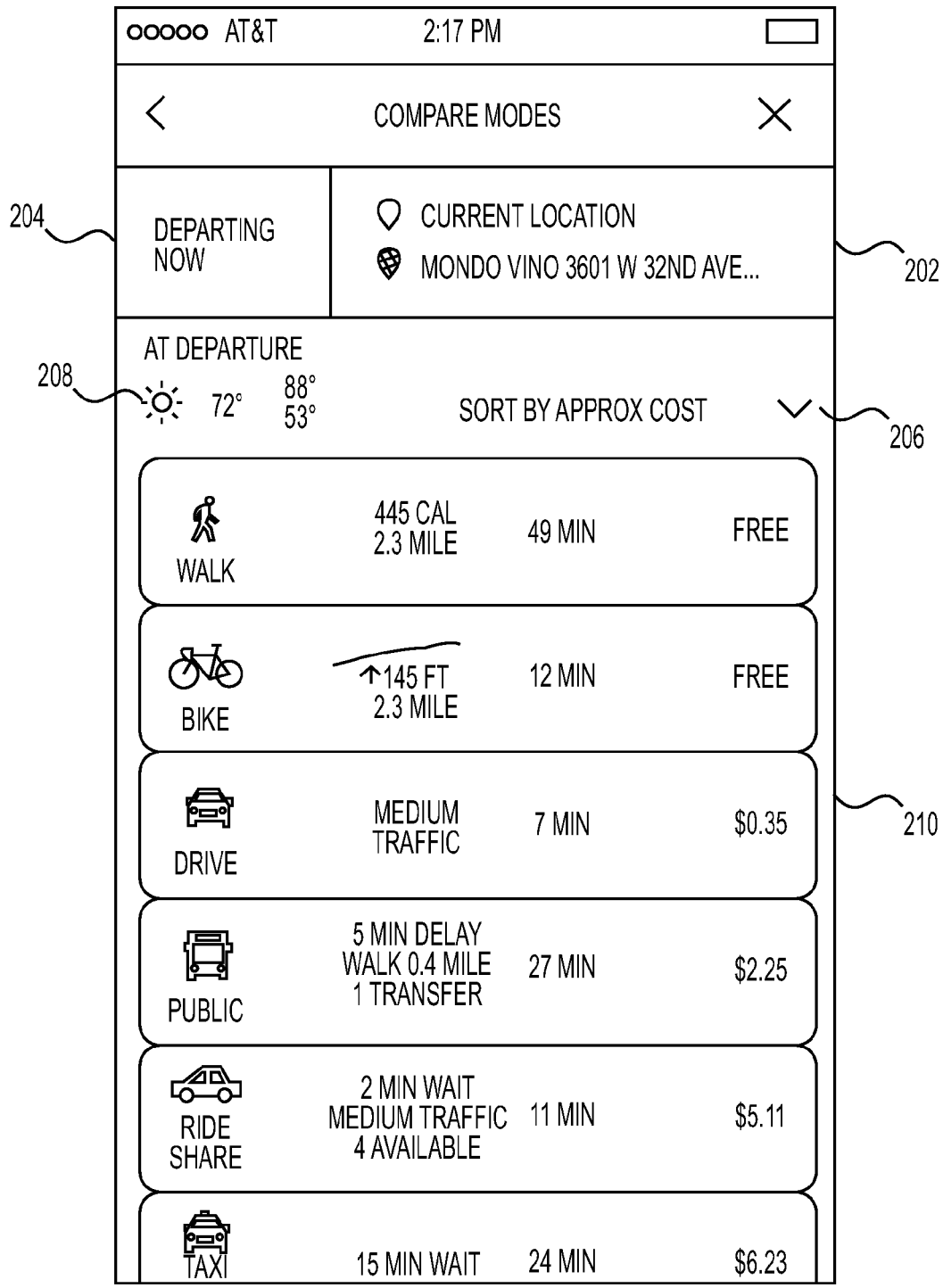
FIG. 2 is a schematic view of an exemplary GUI for display and comparison of acceptable modes of transportation, according to an exemplary embodiment of the present disclosure.

Once at least a user's destination location is received (e.g., as input in FIG. 1 and the selection of the "Compare More" icon 114), several routes, options, and/or modes of transportation may be displayed/suggested to the user. An example of such a display is shown in FIG. 2. FIG. 2 illustrates an example of displaying data for one option for getting to a destination location for various modes of transportation. It should be noted that the GUI of FIG. 2 is merely exemplary. In some examples, multiple options and/or routes may be displayed for each available mode of transportation. For example, in some situations based on the factors and rules further described with respect to FIGS. 4 and 5, it may be determined that three different driving routes are better for the situation (e.g., have a higher mode total weighting) than any walking route. In such an example, all three routes (e.g., options) for driving may be displayed, instead of just one. The information displayed in the GUI of FIG. 2, as well as the information displayed for each mode may be any information, may be displayed in any order, and in any configuration.

The GUI of FIG. 2 includes route locations section 202, departure time section 204, sort section 206, weather section 208, and available modes of transportation section 210. Weather section 208 may include a visual indicator of weather (e.g., the sun symbol of FIG. 2). This information may be received, for example, by weather/news application programming interface (API) 408 of FIG. 4. As will be further described below with respect to FIGS. 4 and 5, information related to weather and/or displayed in weather section 208 may be used in determining which modes to display, sequence, number of options for each mode, etc. The visual indicator in weather section 208 may be the current weather for any point along the route, including, but not limited to, the start location, locations along a route, a location to access a mode of transportation, and/or the destination location. Additionally and alternatively, a weather indicator may indicate predicted weather at the destination location at an estimated (or, in some examples, an average estimated) time of arrival.

Departure time section 204 may be set by user. For example, a user may select the current time, "now," as the departure time (as illustrated in FIG. 2) and/or any time in the future. Available modes of transportation section 210 of FIG. 2 may include data related to leaving at the time in the departure time section 204 to get from the start location to the destination location of the route locations section 202 using one of the options displayed for each mode of transportation. As shown in FIG. 2, the displayed modes may include, for example, walking, biking, driving, taking public transportation, riding in a ride share service, or taking a taxi, and the displayed information may include one of the options available for each of the displayed modes. As further described below, these displayed options and displayed modes of transportation may have been determined as available and/or accessible by analysis server 430 of FIG. 4 and/or method 500 of FIG. 5. Additionally or alternatively, analysis server 430 of FIG. 4 and/or method 500 of FIG. 5 may have determined the order in which these options are displayed (e.g., as shown in FIG. 2, it may have been determined that the displayed option for walking be displayed first).

As shown in FIG. 2, one option is displayed for each mode of transportation. For example, only data related to one route for each of walking, biking, and driving is displayed. Only data related to one form of each of public transportation, one ride share vehicle, and one taxi is displayed. In some examples, multiples options are displayed for modes of transportation. For example, if it is determined that modes of transportation that take less than 30 minutes are favorable (based on the rules/factors as described with respect to FIGS. 4 and 5) any option less than 30 minutes may be displayed. For example, several driving routes and/or car share cars may be displayed. Similarly, if it is determined that modes of transportation involving driving are unfavorable (e.g., the departure time is in the middle of rush hour), one or more options for driving, car share, and/or ride share may be displayed, while multiple options for non-driving modes may be displayed (e.g., routes for walking and/or biking, forms of subways transportation, multiple bike share locations, etc.)

A route for each mode of transportation may be calculated based on the received start and destination locations and accessed mapping/routing data. The routes may be calculated by mapping routing server 340 of FIG. 3 and/or mapping API 410 of FIG. 4. The data related to each option may be received from condition source/database 370 of FIG. 3, a traffic server, third party transportation API 360 of FIG. 3, and/or any API of FIG. 4 (for example, wait time and/or number of available cars within a certain distance may be received from ride share API 416 of FIG. 4; and/or current delays times, distance to access to public transportation, and/or number of transfers to reach destination may be received from public transit API 412 of FIG. 4). Some data, including but not limited to, historical/average speeds, speed limits, elevation changes, terrain, number of stop signs/traffic signals, and/or road type along a route may be stored in a database, such as, for example, condition source/database 370 or a server, such as, for example, route condition server 345 of FIG. 3, Application Server 406 of FIG. 4 and/or analysis server 430 of FIG. 4.

In some embodiments, different data may be displayed for different modes of transportation. As shown in FIG. 2, for each available mode of transportation, an estimated time to reach the destination location and/or an estimated cost of reaching the destination location may be displayed (e.g., far right two columns in the available modes of transportation section 210). In some embodiments, the data displayed may be based on the category selected at sort selection 206. For example, the approximate cost category is the sort selection 206 and as a result, the approximate cost for each mode of transportation is displayed in the available modes of transportation section 210. Similarly, if time were the category selected in sort selection 206, the estimated amount of time to travel from the start definition to the destination location may be displayed in available modes of transportation section 210.

Any data related to each option of an available mode of transportation and/or each available mode of transportation itself, whether or not the data is displayed to the user or in FIG. 2, may be stored and/or used to determine a total mode weight, the sequence of the options/modes, and/or a subset of the option/modes to be displayed. For example, as shown FIG. 2, the data related to an option (e.g., a route) for walking to the destination location may include, but is not limited to, an approximate number of calories that will be burned (e.g., based on human averages, national averages, city averages, gender averages, and/or the specifics statistics of the user), distance with sidewalks, terrain (e.g., smoothness of path), distance with dedicated bike/walk paths, distance on two/four/six lane roads, number of stop lights, and/or the total distance the user will need to walk to reach the destination location. In another example, the data related to an option (e.g., a route) for biking to the destination location may include, but is not limited to, the change in elevation including whether that change is higher or lower (as shown in the second to left column of available modes of transportation section 210), the rate at which elevation changes, the terrain (e.g., smoothness of the path), distance with and without bike lanes, distance on dedicated bike trails, approximate calories burned, and/or total distance (as shown in the second to left column of available modes of transportation section 210).

In examples in which the available mode of transportation is driving or driving with a ride share, car share, or taxi, displayed data may include traffic volume (e.g., light traffic, medium traffic, heavy traffic, standstill, etc.), number and/or cost of tolls, type of roads to be travelled (e.g., two-lane roads, highways, dirt roads, etc.), number of stop signs/traffic lights, number of turns, and/or total distance to the destination location. In examples in which an available mode of transportation involves waiting for the transportation to arrive (e.g., public transportation, ride share, and/or taxi), displayed data may include wait time, ratings of driver or system, average delay, current delay, etc. In an example in which a user must travel to access the mode of transportation (e.g., public transportation, intercity buses, intercity trains, car share, bike share, etc.), the displayed data may include distance to transportation (e.g., distance to bus stop), walk time to transportation, etc. Other data may include number of ride share cars, car share cars, and/or bike share bikes available within a certain distance of the start location, the type of car share cars and/or ride share cars available, the number of transfers (e.g., for public transportation, intercity buses, intercity trains, planes), and/or any other information related to an option for a mode of transportation.

Figure 3:
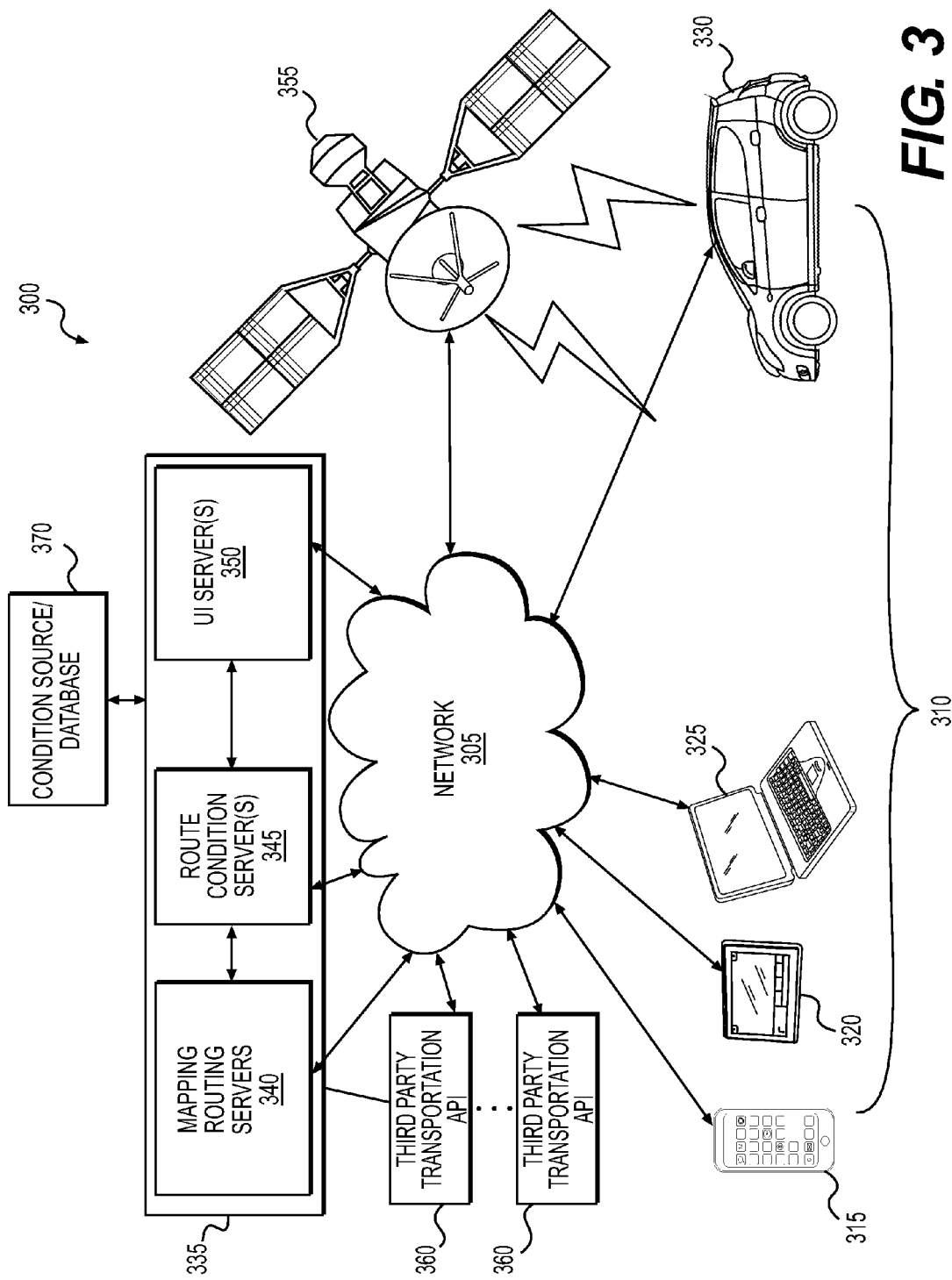
FIG. 3 is a block diagram of a communications system configured to present users with data related to various modes of transportation, according to an exemplary embodiment of the present disclosure.

FIG. 3 is a block diagram of a communications system 300 configured to determine available modes, calculate options and/or routes for reaching a destination, and/or determine data related to each mode of transportation. In general, system 300 may include of plurality of entities, devices, databases, and/or servers configured to communicate through a network 305, such as the Internet. The example of system 300 illustrated in FIG. 3 includes various user devices 310, servers 335, satellite 355, third party transportation APIs 360, and condition source/database 370.

In the example shown in FIG. 3, user devices 310 may include one or more mobile electronic devices 315, which may be a smartphone, a personal digital assistant ("PDA"), a tablet computer, or other type of mobile computing device, such as a device having a touchscreen display. Mobile device 315 and computer 325 may each be equipped with or include, for example, a global positioning system (GPS) receiver for obtaining and reporting location information, e.g., GPS data, via network 305 to and from any of servers 335 and/or one or more GPS satellites 355. GPS device 320 may be a dedicated GPS navigation device having an integrated GPS receiver for exchanging location information with GPS satellite(s) 355 for purposes of tracking a current geographic location of GPS device 320 and its user. GPS device 320 may be a portable or handheld GPS device. Vehicle navigation system 330 may be implemented as, for example, a GPS based in-dash navigation system integrated with the vehicle 330. Such an in-dash navigation system may provide various functions, including a navigation function, via a center console display installed within the vehicle.

However, it should be noted that each of user devices 310, including mobile device 315, GPS device 320, computer 325, and/or vehicle navigation system 330, may be implemented using any type of electronic device configured to send and receive data, including location data (e.g., in the form of latitude and longitude coordinates), to and from a system of servers 335 over network 305. The user input device(s) may include any type or combination of input/output devices, such as a display monitor, touchpad, touch-screen, microphone, camera, keyboard, and/or mouse.

Furthermore, it should be noted that any of various techniques may be used to derive geographic location information for any of user devices 310, particularly in cases where GPS data may not be available, for example, in urban canyons or other locations where line-of-sight to GPS satellites may not be feasible. Examples of other techniques that may be used for deriving location information for any of user devices 310 include, but are not limited to, cell identification (e.g., using Cell ID), cellular tower triangulation, multilateration, WI-FI, or any other network or handset based technique for deriving location information for a mobile device. The various user devices 310 may also communicate with each other by any suitable means (e.g., via WI-FI, radio frequency (RF), infrared (IR), BLUETOOTH, Near Field Communication, or any other suitable means) to send and receive location and other information. For example, a mobile device 315 may communicate with GPS device 320 or vehicle navigation system 330.

In one embodiment, each of user devices 310 may be configured to execute a mobile client application for providing various functions of a mapping service hosted at mapping sever systems 335. Examples of such functions may include, but are not limited to, determining available modes, determining various routes or options for each available mode, viewing and manipulating digital maps, and route planning and navigation. Some or all of servers 335 and/or the functions of servers 335 may be the entirety of, interchangeable with, or may be used in conjunction with mapping API 410 and/or mapping engine 432 of FIG. 4. The client application executable at each user device 310 may be configured to process and execute instructions and save data in memory. The client application may also be configured to provide the various mode or option comparisons and/or mapping functions to the user through a GUI, such as the GUIs of FIGS. 1 and 2, presented via a display, e.g., capacitive touch-screen display, coupled to each user device 310. The client application executable at each user device may be a standalone mobile application or may be configured to execute within, for example, a web browser based on web page data loaded within the browser or similar application executable at each of user devices 310.

For example, the user device 310 may receive information via the network 305 from the system of servers 335, having one or more servers such as mapping routing servers 340, route condition servers 345, user interface servers 350, and/or any other suitable servers. Each server in the system of servers 335, including mapping routing server 340, route condition server 345, and UI server 350 may include any of various types of servers including, but not limited to a web server, an application server, a proxy server, a network server, or a server farm. Each server in the system of servers 335 may be implemented using, for example, any computing systems configured for serving data to other computing devices including, but not limited to, user devices 310 (including mobile device 315, GPS device 320, and computer 325) or any other computing device (not shown) via network 305. Such a computing system can include, but is not limited to, a server device having a processor and memory for executing and storing instructions. The memory may include any type of random access memory (RAM) or read-only memory (ROM) embodied in a physical storage medium, such as magnetic storage including floppy disk, hard disk, or magnetic tape; semiconductor storage such as solid-state disk (SSD) or flash memory; optical disc storage; or magneto-optical disc storage. Software may include one or more applications and an operating system. Hardware can include, but is not limited to, a processor, memory, and graphical user interface display. Each server may also have multiple processors and multiple shared or separate memory components that are configured to function together within, for example, a clustered computing environment or server farm.

The mapping routing server 340 may have a processor configured to retrieve mapping information and generate routing information. Additionally or alternatively, mapping routing server 340 may include a processor configured to retrieve and/or provide data to/from third party transportation APIs 360 such as, for example, those of ride share services, car share services, bike share services, taxis, and/or public transportation (e.g., public transit API 412, car share API 414, ride share API 416, and/or bike share API 418 of FIG. 4). Route condition server 345 may include a processor configured to retrieve route condition information and/or provide route condition information from condition source database 370 or third party sources (e.g., weather/news API 408 of FIG. 4). Additionally or alternatively, route condition server 345 may have database that is a subset of condition source/database 370 or a separate database of historic average speeds, route terrain, speed limits, current and/or historic traffic data, elevation change along the route, average parking spots, tolls, number/location of police along the path, average distance from parking to destination, etc. The user interface server 350 may be configured to generate and display GUIs disclosed with respect to FIGS. 1 and 2, receive and process user input, such as mode, partner, route, and/or condition preferences.

The mapping routing server 340 may receive information regarding a user's trip, such as a start location, destination location, and any user route and/or mode preferences directly from the user device 310 via the network 305 or indirectly via the user interface server 350. The mapping routing server 340 may save the information in memory, such as a computer readable memory. Mapping routing server 340 may then calculate various routes and determine modes of transportation from the received information. This may be determined by comparing the received information to known routes, such as roadways and bike paths, existing and internal algorithms, and/or by accessing third party APIs, e.g., third party transportation APIs 360. For example, the mapping routing server 340 may be in communication with one or more other servers, such as the route condition server 345 and/or external servers, such as servers of third party transportation APIs 360. The third party transportation APIs 360 may include those of slug lines, ride share services, car share services, bike share services, public transportation, airlines, boat services, ferries, intercity bus companies, intercity train companies, and any other APIs affiliated with information related to travelling from one location to another. The information provided by third party transportation APIs 360 may be displayed to the user or used to derive information, such as routes, distances, durations, ETA, etc., to be displayed to the user. For example, a ride share service may provide wait time data that may be displayed in a compare modes screen (e.g., FIG. 2).

The route condition server 345 and/or condition source/database 370 may store or have access to data from other users, traffic reports, weather reports, police reports, road construction, and/or any other source of relevant information. The route condition server 345 may process the information for display on the user device 310. As will be described in further detail below, such a condition source/database 370 may be used (e.g., by route condition server 345 and/or mapping routing server 340) to store and retrieve data related to certain conditions along the route. The data associated with the routes or points along the route may include, for example, current speeds, historic average speed, posted speed limits, construction zones, speed cameras, location of police officers, stopped vehicles, current traffic, parking spots at destination, terrain, elevation changes, accidents, weather, special events, and/or rush hour. In some examples, system 300 may access and retrieve the traffic or route condition data stored or developed on condition source or database 370 via a network 305. The retrieved traffic and/or condition data may be used for display and/or processing by one or more user devices 310, such as a mobile device 315 (e.g., mobile phone, personal digital assistant, tablet computer), a GPS device 320, a computer (laptop, desktop, tablet) 325, an in-vehicle navigation system 330, and/or any device connected to a network 305, such as the Internet, according to an exemplary embodiment of the present disclosure.

Figure 4:
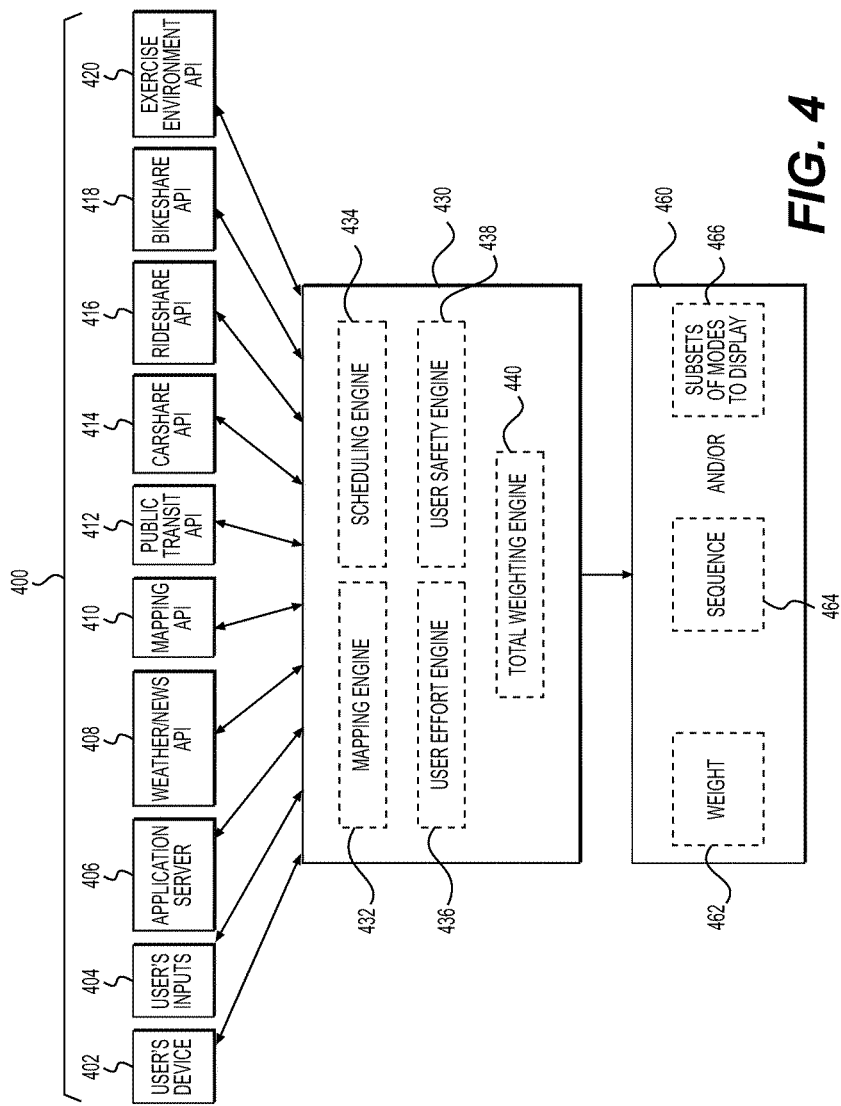
FIG. 4 is a schematic diagram of an exemplary architecture for reviewing data from various internal and third party sources and determining acceptable modes of transportation, as well as which subset of the available modes of transportation should be displayed and in what sequence, according to an exemplary embodiment of the present disclosure.

FIG. 4 illustrates an exemplary server/server system configured to receive data from various internal and third party sources and output data related to various modes of transportation. In particular, the server system of FIG. 4 may determine available and/or acceptable modes of transportation, as well as, which subset of the available modes of transportation should be displayed and in what order. The server/server system may include various information sources 400, analysis server 430, and/or server output 460. The information sources, including but not limited to internal databases, user data, and/or third party APIs, may be in communication with analysis server 430. Analysis server/server system 430 of FIG. 4 may receive data and perform various routines and/or subroutines to determine server output 460, e.g., acceptable modes of transportation for navigation between a start and at least one destination location, a weight for each mode of transportation, which subset of options/modes to display, and/or an order in which each option/mode is displayed.

Analysis sever 430 may receive the information for analysis from any source including, but not limited, to both internal (e.g., internal databases) and/or external (e.g., third party APIs). FIG. 4 illustrates an exemplary system, but the disclosure is not intended to be limited to the sources therein. For example, an analysis server 430 may have more or fewer sources of information.

User's device 402 (e.g., user devices 310 of FIG. 3) may be one source of information used to determine the modes of transportation to be displayed and the sequence in which the modes of transportation are displayed. A few examples of information that may be provided by the user's device include the current location of the user's device, other installed client applications on the user's device, any event data from the user's calendar, and/or the battery status of the user's device. Data provided from the user's device may be used and/or incorporated into the analysis in any way. For example, the current location of the user's device may indicate a start location for the directions. Other installed client applications may indicate a membership in a car share, bike share, and/or ride share service or a preference to use public transportation (e.g., the local public transportation application is installed on and/or used often on the user's device). Client applications related to the environment or carbon footprint may indicate that options and/or modes of transportation resulting in low carbon emissions should be increased in weight. Client applications for dieting, pedometers, and/or calorie counting may indicate options and modes that are determined to burn more calories (as determined by user effort engine 436 and/or exercise/environment API 420) may be increased in weight. The event data on the user's calendar may be used in the analysis. For example, if the user's calendar indicates that the user has an event in 30 minutes, such information may indicate a mode or option that takes more than 30 minutes is unacceptable and/or should be decreased in weight. Similarly, the current battery status may be used in the analysis. For example, if the user has limited battery, options that take more time than is estimated the device has battery may be unacceptable and/or be decreased in weight. Additionally or alternatively, options that have fewer directions (e.g., fewer turns or changes in transportation, etc.) may be increased in weight as they make take less battery power and/or the user may be more likely to remember the directions if the device runs out of battery.

User's inputs 404 may be another source of information used to determine the modes of transportation to be displayed and the sequence in which the modes of transportation are displayed. Examples of user's input 404 may include, but are not limited to, log-in information, preferences, destination, location of user's home, location of user's car, etc. For example, a user may be asked to take survey. The user may indicate that if it is dark, which may depend on the time of the year, walking is an unfavorable mode of transportation. Such inputs by the user may be scaled, e.g., the user would prefer not walk after dark (decrease in weight of walking option) or the user will never walk after dark (walking mode is not selected for the acceptable modes of transportation subset and is thus never displayed, as further described in method 500 of FIG. 5). In some embodiments, the user may rank modes of transportation. For example, the user may indicate that she prefers to drive or pick her top three preferred modes of transportation. Similarly, the user may not own a bike and may request that bike routes are never displayed (e.g., not part of the acceptable modes subset). The destination location may be used in the analysis server 430 (and subroutines therein). For example, the destination location may have limited or expensive parking and may be decreased in weight or be an unacceptable mode. The destination location may be combined with data from other sources, e.g., weather/news API, to determine the crime rate. If the destination location has an unfavorable factor, such as a high crime rate, the weight for walking may be decreased as it may be assumed that a user may not want to walk in a high crime area. The location of the user's home may be used in the analysis. For example, if the destination location is the same as the user's home, driving may be increased in weight, because it may be assumed the user will want to have her car at home. Similarly, this may be combined with information from other sources, like the time and date from the application server 406. For example, if the destination location is the user's home and the time is 2 a.m. (the time bars close as determined from information received from the weather/news API 408), analysis server 430 may determine that the user may be intoxicated and may decrease the weight of driving or even remove it entirely from the acceptable modes subset. The location of the user's car may be used in the analysis. For example, if the user's car is a threshold distance away from the current location of the user's device or from the input start location, it may be determined that driving is not an acceptable mode of transportation or that the weight for driving should be decreased. In one example, if the user's car is parked over 2 miles away, it may be determined that it should be not suggested that the user drive because it is not reasonable for her to walk all the way to her car. If the user's car is farther away than a ride share or car share car, it may be determined that it is more "optimal" to take one of those options and the weight for driving may be decreased. Additionally, knowledge regarding the location of the user's car may affect the suggested routes. For example, any driving instructions that are determined and displayed may include ways to reach the user's car first (e.g., walking, biking, public transportation, etc.). The user may input the location of her car or the location of the car may be determined based on a number of factors including: the last location the navigation application ended, repeated parking in one location, a connection between the in-car navigation and the analysis server 430, etc.

Application server 406 may be another source of information used to determine the modes of transportation to be displayed and the sequence in which the modes of transportation are displayed. For example, application server 406 may communicate various historical and/or institutional information/knowledge, such as the time and date, user's history, other users' history, and assumptions (e.g., the developer's assumptions). For example, if a user chooses a ride share service the majority of the instances she uses the application after midnight, this may indicate a positive weighting for the ride share service after midnight. Similarly, a database of user behavior may be available and, in one example, if 75% of users bike in Denver, Colo., the bike mode may be given a positive weighting when the user device 310 is in Denver, Colo. A user's demographic information may be used in combination with other users' history. For example, if a database indicates that the majority of male users aged 55-65 select "driving" as the mode of transportation and the user associated with the user device is a male aged 55-65 (e.g., as the user indicated in a survey) this may increase the weight of the driving mode of transportation.

Weather/news API 408 may be another source of information used to determine the modes of transportation to be displayed and the sequence in which the modes of transportation are displayed. The weather/news API 408 may provide information related to weather, local events, crime data, tourist data, etc. In one example, if a weather/news API 408 indicates it is currently raining or will be raining when the user has requested directions for (e.g., time of departure section 104 of FIG. 1), modes of transportation that require the user to be in the elements for extended periods of time (e.g., biking, walking, public transportation that requires a long wait time or travel to access, car share that is a significant distance from the start location, etc.) may be decreased in weight. Similarly, if the weather/news API 408 indicates that the start and/or destination location are in an area with a "high crime" rate, then any modes of transportation that increase the time the user spends outside (e.g., walking, biking, waiting for a bus), may be decreased in weight. Similarly, routes (e.g., as determined by, for example, mapping API 410) that travel through areas with "high crime" rate may be decreased in weight.

Mapping API 410 may be another source of information used to determine the modes of transportation to be displayed and the sequence in which the modes of transportation are displayed. Mapping API 410 may be a third party API. Mapping API 410 may provide any information related to maps or routes, including but not limited to, routing from origin to destination, traffic (current and/or historic), travel times and/or distances, terrain along the various determined routes, and/or parking information at or near the destination location. In some examples, the above described information is received and provided by an internal database and/or algorithm. In some examples, servers 335 of FIG. 3 may provide this information, use this information, and/or may include mapping API 410.

Public transit API 412 may be another source of information used to determine the modes of transportation to be displayed and the sequence in which the modes of transportation are displayed. Public transit API 412 may provide information related to any public transportation system, including but not limited to, subway, buses, trolley cars, etc. Information provided by a public transit API may include time, distance, and/or cost to the destination location, availability, wait time, and/or estimate time of arrival for a particular form of transportation. In one example, a long wait time may indicate that the public transportation mode of transportation or a particular option for public transportation should be decreased in weight.

Car share API 414 may be another source of information used to determine the modes of transportation to be displayed and the sequence in which the modes of transportation are displayed. Car share API 414 may provide information related to companies that offer cars for user to borrow and personally drive. In some embodiments, car share companies may include rental car companies, such as HERTZ, ALAMO, etc. In some embodiments, car share companies may include cars for the short term. Often these "short-term" rental cars are positioned at multiple locations in a city. Such companies may include CAR2GO or ZIP-CAR. A car share API 414 may provide information related to the time, distance, and/or cost of various available car(s) to borrow, availability of car(s), and/or wait time.

Ride share API 416 may be another source of information used to determine the modes of transportation to be displayed and the sequence in which the modes of transportation are displayed. Ride share API 416 may be a slug line and/or chauffer service in which a third party drives a user/member from a location (either user's start location or a pick-up location) to a destination location. Some examples of ride share companies include UBER and LYFT. Ride share API 416 may provide information related to the availability of a ride share vehicle, location of pick-up (especially for a slug line pick-up), the time, distance, and/or cost of travelling from the start location to the destination location using various options/routes for a ride share car, wait time before a ride share vehicle (or multiple vehicles) may arrive at the user's start location, and/or line length at various slug line pick-up locations.

Bike share API 418 may be another source of information used to determine the modes of transportation to be displayed and the sequence in which the modes of transportation are displayed. Bike share API 418 may provide information from any service that provides bicycles for users/members to borrow. Some examples include an API of Capital Bikeshare, Spotcycle, CycleHop, B-Cycle, etc. Analysis server 430 may retrieve information from one or more bike share APIs related to the availability of bikes, the time, distance, and/or cost of using a bike share bike in order to get from a start location to a destination location, wait time, and/or estimated time of arrival at a specific location with bikes available to borrow (e.g., how long it would take a user to walk or drive to a bike).

Exercise/environment API 420 may be another source of information used to determine the modes of transportation to be displayed and the sequence in which the modes of transportation are displayed. For example, exercise/environment API 420 may provide analysis server 430 with information related to or used to calculate a user's exercise and/or the environmental impact of various options and/or mode of transportation from the start to the destination location to analysis server 430. Such information may include the number of calories a user would burn depending on the mode of transportation and/or the route. Information related to the carbon footprint for each mode may be calculated.

Analysis server/server system 430 may perform some or all of the steps of method 500 described below with respect to FIG. 5. Analysis server may have any subroutines to calculate/determine server output 460. These subroutines may include, but are not limited to, a mapping engine 432, scheduling engine 434, user effort engine 436, user safety engine 438, and/or total weighing engine 440.

Mapping engine 432 may be a subroutine within analysis server 430. Mapping engine 432 may perform some or all of the steps of method 500 described below with respect to FIG. 5. Mapping engine 432 may determine any information related to mapping, including, but not limited to, routes, routes conditions, travel times and distances, etc. Mapping engine 432 may use any of the information from the sources of information 400 displayed in FIG. 4, information in stored in a database associated with analysis server 430, and/or any other source of internal or external information. In some examples, mapping engine 432 may use the current location of the user device (e.g., user device 310 of FIG. 3), destination location (e.g., as input by the user or assumed by the analysis server 430 and/or application server 408), the selected mode of transportation and/or option of a mode of transportation, the location of the user's car, location of the user's home and/or work, and/or information provided from a mapping API (e.g., Mapping API 410 providing, for example, routing from origin to destination, traffic (current and/or historic), travel times and/or distances, terrain along the various determined routes, and/or parking information at or near the destination location). In some examples, mapping engine 432 may be performed by one or more servers 335 of FIG. 3.

Scheduling engine 434 may be a subroutine within analysis server 430. Scheduling engine 434 may perform some or all of the steps of method 500 described below with respect to FIG. 5. Scheduling engine 434 may determine any information related to timing and/or third party operated modes of transportation. Scheduling engine 434 may perform analysis/calculation based on the current time and/or date, a user timing preferences, and/or information from a mapping API (e.g., mapping API 410), a public transit API (public transit API 412), a car share API (e.g., car share API 414), a ride share API (e.g., ride share API 416), and/or a bike share API (e.g., bike share API 418). For example, a scheduling engine 434 may receive the current location of a user device and the estimated travel time to reach a subway station from mapping API 410 and/or mapping engine 432 and receive the schedule of the subway and current delay times from public transit API 412. Scheduling engine 434 may then be able to determine which subway trains are available to the user and/or an estimated ETA.

User effort engine 436 may be a subroutine within analysis server 430. User effort engine 436 may perform some or all of the steps of method 500 described below with respect to FIG. 5. User effort engine 436 may determine any information related to the effort a user must make in order to get to the destination, including, but not limited to, calories burned, terrain, elevation changes, time spent in "bad" weather, number of transfers, etc. In some examples, user effort engine 436 may determine an exercise weighting and/or carbon footprint weighting. User effort engine 436 may perform analysis based on user effort preferences (e.g., as input by the user and/or learned through the user's actions), terrain data as stored or determined from an internal data and/or an external database or server, such as from mapping API 410 of FIG. 4 and/or source/condition database 370 of FIG. 3, and/or calories/effort from an internal or external database/server related to exercise (e.g., exercise/environment API 420 of FIG. 4).

User safety engine 438 may be another subroutine within analysis server 430. User safety engine 438 may perform some or all of the steps of method 500 described below with respect to FIG. 5. User safety engine 438 may determine any information related to a user's actual or perceived safety, including but not limited to, determining whether any point along the route is a high crime area, whether a walking route includes a path or sidewalks, whether a biking route includes a path or bike lanes, etc. User safety engine 438 may perform analysis based on user safety preferences (e.g., as input by the user and/or learned through the user's actions), the current time and/or date, API provided maps, routes, etc. (e.g., mapping API 410), and/or crime data (e.g., from a news API, such as weather/news API 408.)

Total weighting engine 440 may be another subroutine within analysis server 430. Total weighting engine 440 may perform some or all of the steps of method 500 described below with respect to FIG. 5. Total weighting engine 440 may perform analysis based on user preferences, assumptions, weather/news API 408, mapping API 410, public transit API 412, car share API 414, ride share API 416, bike share API 418, and/or exercise/environment API 420. Total Weighting Engine 440 may take into account any number of factors and/or any algorithms to calculate a weight for each option and/or mode and/or determine when a mode or option's weight should be increased or decreased.

Analysis server 430 and/or some or all of the subroutines described in FIG. 4, may produce server output 460. Server output 460 may provide output in any way. Server output 460 may include a weight 462, sequence 464, and/or subsets of modes to display 466. Weight 462 may be a numerical or quantitative indicator for each available mode of transportation and/or option for each available mode of transportation (e.g., total mode weight of method 500). Sequence 464 may be an order the modes of transportation should be displayed in. This may be a rank, rating, etc. Sequence 464 may be based on weight 462. For example, the mode or option with the highest weight 462 may be displayed first. Subsets of modes to display 466 may be a list of the modes of transportation with the highest weights. For example, it may be determined that five options should be displayed and/or that a particular GUI has sufficient room to display, and the five modes of transportation with highest weight 462 may be the output for subsets of mode to display 466.

Figure 5:
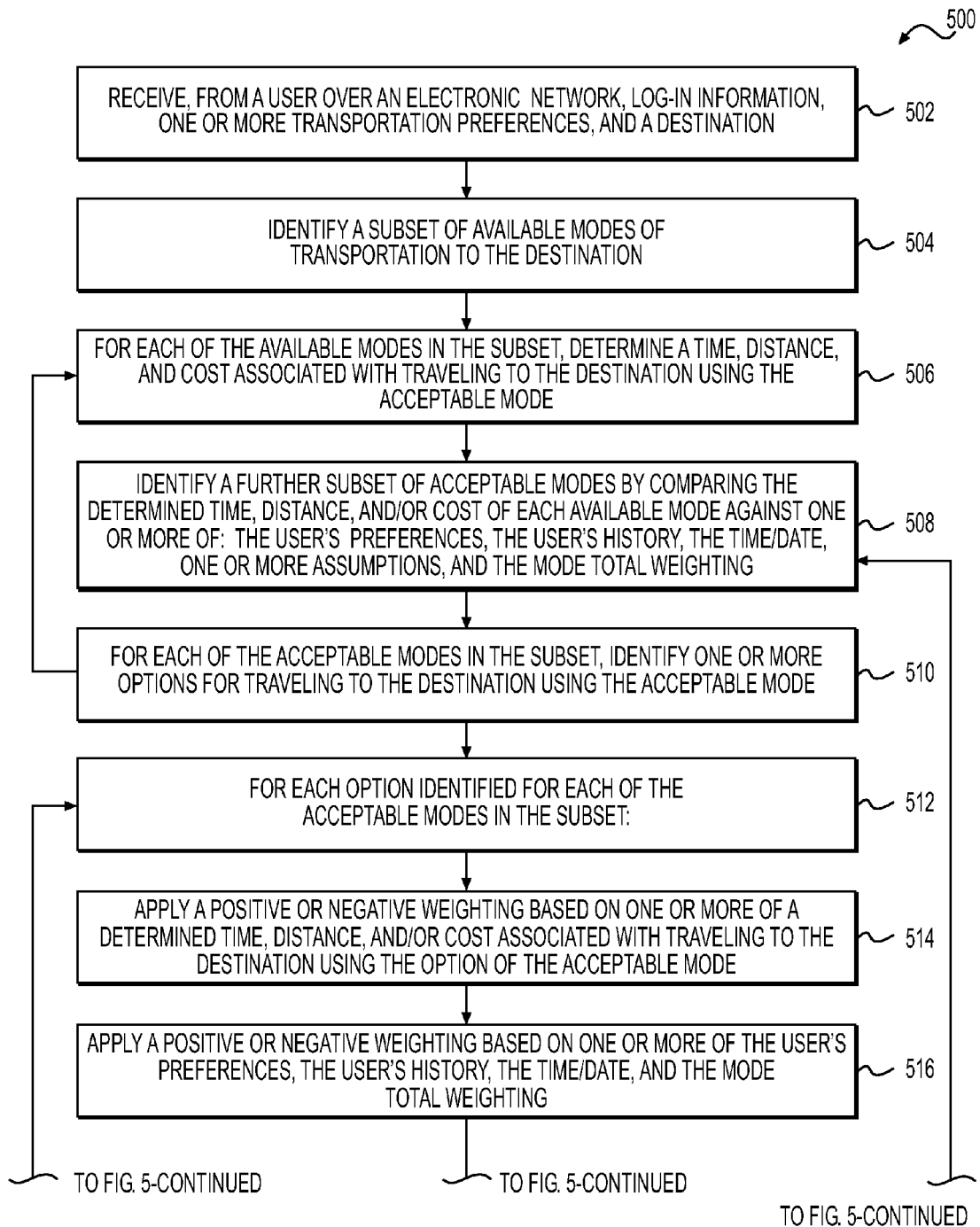
FIG. 5 is a flow diagram of an exemplary method of receiving data from various internal and third party sources and determining acceptable modes of transportation, as well as, which subset of the available modes of transportation should be displayed and in what sequence, according to an exemplary embodiment of the present disclosure.
Figure 5:
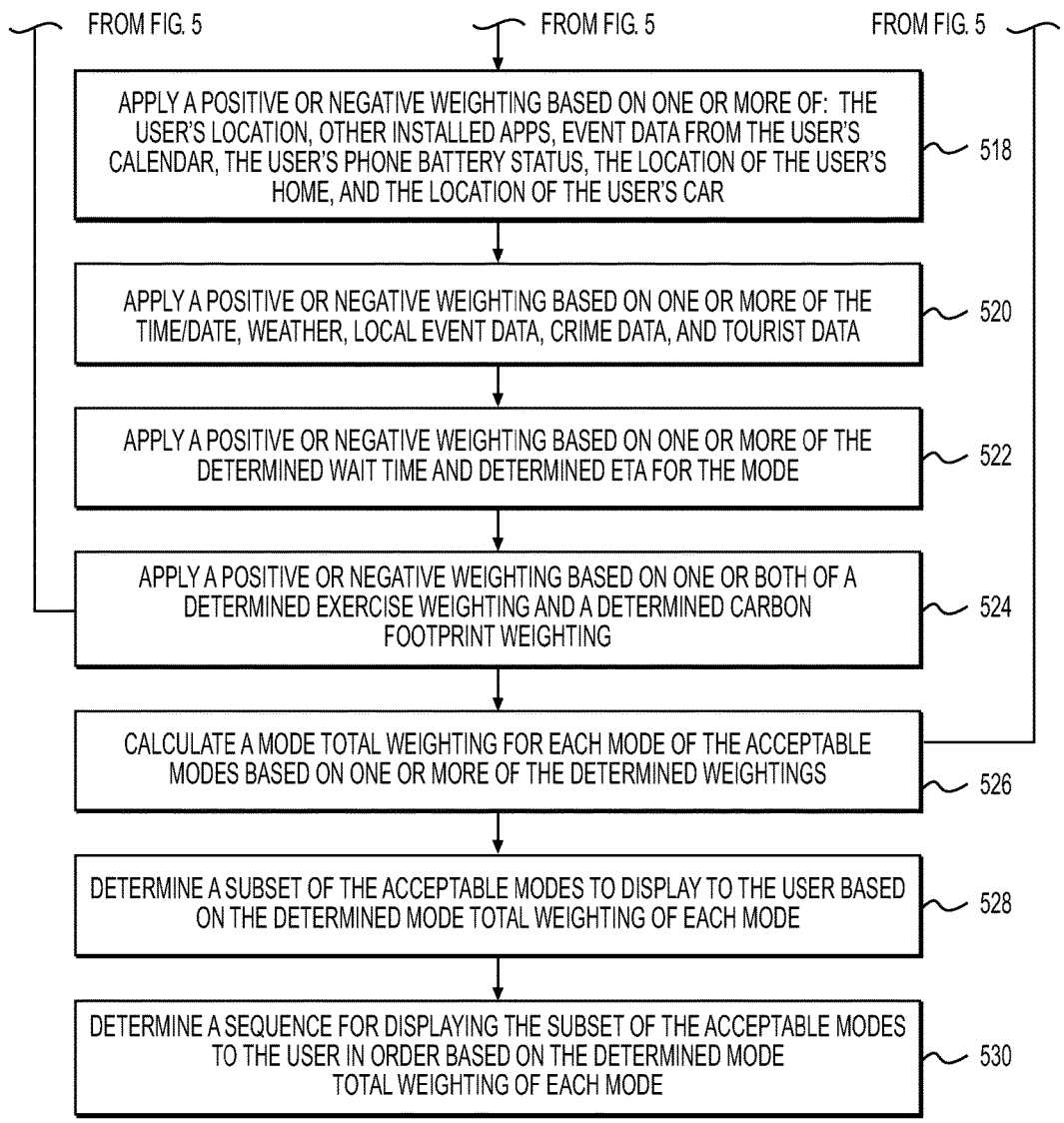

FIG. 5 is a process flow diagram of an exemplary method 500 for determining which options and/or modes of transportation to display and/or the sequence in which these options/modes are displayed. For purposes of discussion, method 500 will be described using system 300 of FIG. 3 (including servers 335 and condition database/source 370) and the server system of FIG. 4, as described above, but method 500 is not intended to be limited thereto. As shown in FIG. 5, method 500 includes steps 502, 504, 506, 508, 510, 512, 514, 516, 518, 520, 522, 524, 526, 528, and 530. However, it should be noted that method 500 may include more or fewer steps as desired for a particular implementation. In an example, one or more of the above-listed steps of method 500 may be executed by servers 335 of FIG. 3 and/or analysis server 430 of FIG. 4, as described above. However, method 500 is not intended to be limited thereto, and the steps of method 500 may be performed by any server or other type of computing device having at least one processor, a memory, and a network communication interface for sending and receiving information from one or more user devices.

Method 500 may begin in step 502, which may include receiving from a user over an electronic network, log-in information, one or more transportation preferences, and/or a destination. Some or all of this information may be provided via, for example, the GUI of FIG. 1. Log-in information and/or one or more transportation preferences may include user's name, demographic information, payment information, partner memberships, user's preferences etc. This information may be provided to a server, e.g., analysis server 430, by user's device 402, user's inputs 404, and/or application server 406.

Once various data is received from the user in step 502, method 500 may proceed to step 504. In step 504, a subset of available modes of transportation to the destination may be identified. This subset of available modes may be determined in any way. In some examples, this subset may be determined based on the location of the user's device or user's partner memberships. For example, if the current location is a rural area, public transportation may not be available from the start to the destination location so public transportation would not be identified in the subset of available modes in step 504. If the user has indicated that she is a member of a partner's car share service, car share service may be identified in the subset of available modes in step 504. The information used to determine this subset may be provided by any information sources 400 of FIG. 4.

Once the subset of available modes of transportation to the destination is identified, method 500 may proceed to step 506. In step 506, for each of the available modes in the subset (e.g., the results of step 504), a time, distance, and/or cost associated with traveling to the destination using the available mode may be determined. This information may be determined in any way. In some examples, a time, distance, and/or cost associated with traveling to the destination using each available mode may be determined based on information provided by the information sources 400. The time, distance, and/or cost associated with traveling to the destination using each available mode may be determined using any algorithm, engine, server, etc., including analysis server 430, mapping engine 432, scheduling engine 434, user effort engine 436, user safety engine 438, and/or total weighting engine 440.

By comparing the determined time, distance, and/or cost of each available mode (e.g., as determined in step 506) against one or more of: (1) the user's preferences, (2) the user's history, (3) the time/date, (4) one or more assumptions, and (5) the mode total weighting, a further subset of acceptable modes may be identified. The mode total weighting may be calculated in step 526, as described in more detail below. In the first iteration of this method, however, a mode total weighting may be preset. The mode total weighting for each mode of transportation may be preset to the weight and/or modes may have different weights based on developer assumptions, statistics, and/or developer's partnership agreements with third party transportation providers.

In step 510, for each of the acceptable modes in the subset (e.g., as identified in step 508), one or more options for traveling to the destination using the acceptable mode may be identified. For example, an option may be a route, a car share vehicle, a ride share vehicle, subway lines, etc. In some examples, once step 510 of method 500 is complete, method 500 may proceed to step 506 (e.g., until data for every available mode of transportation has been determined and compared to various factors) or method 500 may proceed to step 512.

In step 512, for each option identified for each of the acceptable modes in the subset, steps 514, 516, 518, 520, 522, and/or 524 may be performed. In step 514, a positive or negative weighting may be applied based on one or more of a determined time, distance, and/or cost associated with traveling to the destination using the option of the acceptable mode. For example, additional time, distance, and cost may apply a negative weight, but less time, distance, and cost may apply a positive weight.

In step 516, a positive or negative weighting may be applied based on one or more of the user's preferences, the user's history, the time and date, and the mode total weighting. In step 518, a positive or negative weighting may be applied based on one or more of: the user's location, other installed apps, event data from user's calendar, the user's phone battery status, the location of the user's home and/or the location of the user's car. In other words, the criteria received from sources of information 402 and/or 404 of FIG. 4 may be used to apply a positive or negative weighting. For example, if the user's location is above a threshold distance from the user's car, options involving the user driving may be given a negative weighting.

In step 520, a positive or negative weighting may be applied based on one or more of the time/date, weather, local event data, crime data, and/or tourist data. In some examples, the information used in step 520 may be received from application server 406 and/or weather/news API 408 of FIG. 4. In step 522, a positive or negative weighting may be applied based on one or more of the determined wait time and determined estimated time of arrival for the mode. In some examples, the information used in step 522 may be received by the analysis server from mapping API 412, car share API 414, and/or ride share API 416 of FIG. 4. In step 524, a positive or negative weighting may be applied based on one or both of determined exercise weighting and a determined carbon footprint weighting. For example, the information used in step 524 may be received by the analysis server from exercise/environment API 420.

Once method 500 completes one or all of steps 516, 518, 520, 522, and 524, method 500 may proceed to step 512 and for each option identified for each of the acceptable modes in the subset, one, or all of steps 516, 518, 520, and/or 524 may be repeated. In some examples, once method 500 completes one or all of steps 516, 518, 520, 522, and/or 524, method 500 may proceed to step 526. In step 526, a mode total weighting (e.g., weight 462 of FIG. 4) for each mode of the acceptable modes based on one or more of the determined weightings may be calculated. In some examples, method 500 may proceed to step 508 after step 526. Alternatively, method 500 may proceed to step 528. In step 528, a subset of the acceptable modes to display to the user (e.g., subsets of mode to display 466 of FIG. 4) may be determined based on the determined mode total weighting of each mode. For example, a GUI may only display six modes of transportation (e.g., the GUI of FIG. 2). In such an example, the subset (e.g., six) modes of transportation of the acceptable modes of transportation with the highest total weightings may be displayed. In other examples, e.g., the GUI of FIG. 1, three modes of transportation (e.g., the quick directions section) may be displayed and the three modes of transportation with the highest total weightings will be displayed in the GUI of FIG. 1. Finally, in step 530, a sequence for displaying the subset of the acceptable modes may be determined based on the determined mode total weighting of each mode. For example, a mode of transportation within the subset of acceptable modes of transportation with the highest total weighting may be displayed first.

In some embodiments, in addition or as an alternative to a subset to display (step 528) and/or a sequence of display (step 530), method 500 may recommend a single mode of transportation and/or option of a mode of transportation. For example, a GUI may only display the recommended option/mode. Alternatively, the subset of options/modes generated in step 530 may be displayed as well as an indicator (e.g., a text, symbol, etc.) indicating the recommended option/mode. In one example, the GUI may include text stating "walking on the bike path is the recommended route." In another example, the walking option may be highlighted or have a symbol next to it.

Figure 6:
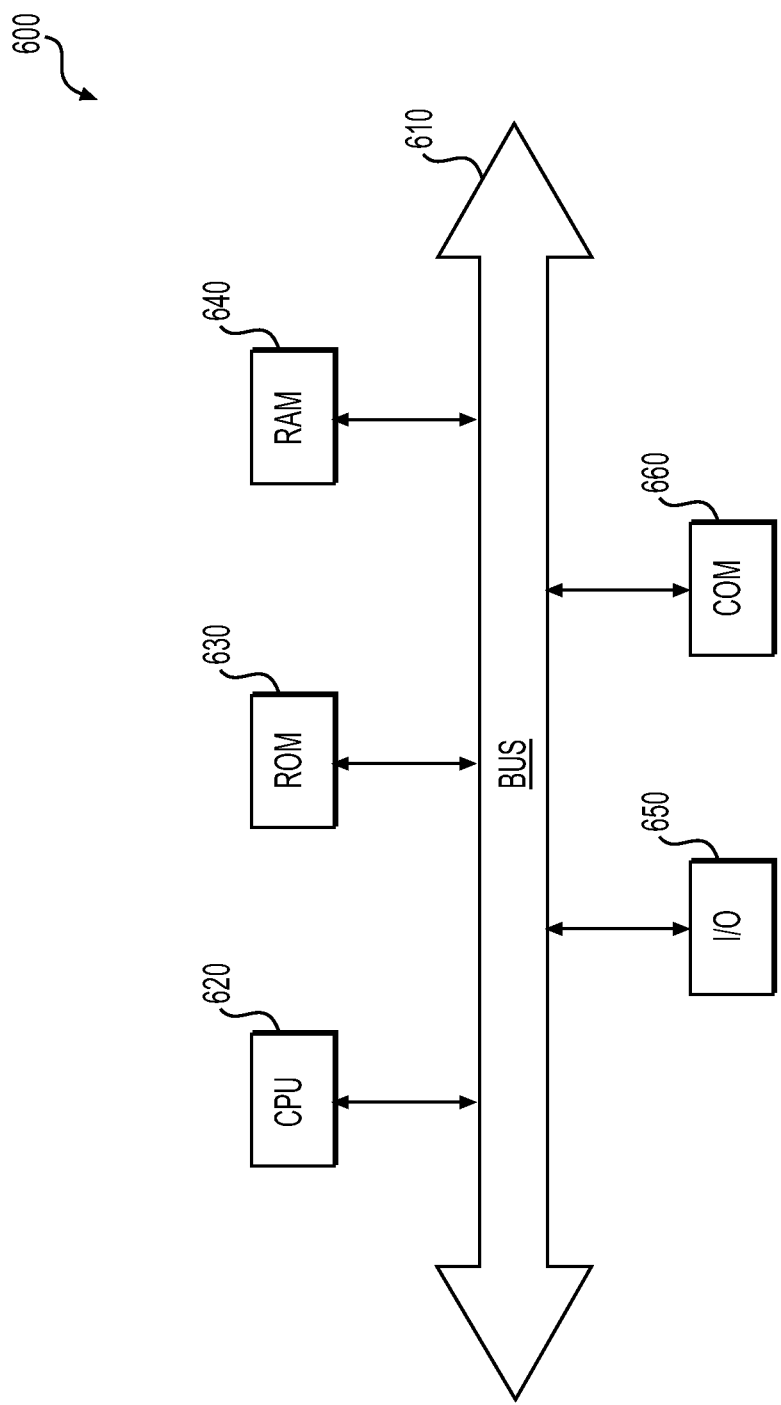
FIG. 6 is a block diagram of an exemplary computer system in which embodiments of the present disclosure may be implemented.

FIG. 6 provides a functional block diagram illustration of a computer hardware platform consistent with the present disclosure. FIG. 6 illustrates a network or host computer platform 600, as may typically be used to implement a server like the mapping server system 340. It is believed that those skilled in the art are familiar with the structure, programming, and general operation of such computer equipment and as a result, the drawings should be self-explanatory.

A platform for a server or the like 600, for example, may include a data communication interface for packet data communication 660. The platform may also include a central processing unit (CPU) 620, in the form of one or more processors, for executing program instructions. The platform typically includes an internal communication bus 610, program storage, and data storage for various data files to be processed and/or communicated by the platform such as ROM 630 and RAM 640. The hardware elements, operating systems, and programming languages of such equipment are conventional in nature, and it is presumed that those skilled in the art are adequately familiar therewith. The server 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for determining modes of transportation for display, the method comprising:
   receiving, for a user over an electronic network, log-in information, one or more transportation preferences and a destination;
   identifying a subset of available modes of transportation to the destination;
   determining one or more available routes associated with each of the subset of available modes of transportation to the destination;

determining a time, distance, and cost associated with traveling to the destination using the one or more available routes associated with each available mode;

determining a total weight for each of the one or more available routes associated with each available mode by comparing the determined time, distance and cost of the one or more available routes of each available mode against one or more of preferences of the user, history of the user, or a date and time;

determining user device data locally available on a user mobile device associated with the user;

increasing or decreasing the total weight for each of the one or more available routes associated with each available mode by analyzing the user device data of the user mobile device;

determining safety data associated with each of the one or more available routes associated with each available mode;

increasing or decreasing the total weight for each of the one or more available routes associated with each available mode by analyzing the safety data;

identifying a further subset of acceptable routes and acceptable modes, the further subset of acceptable routes being a subset of the one or more available routes associated with each available mode and the further subset of acceptable modes being a subset of the subset of available modes, based on the determined total weight for each of the one or more available routes associated with each available mode; and displaying, to the user, at least one option for traveling to the destination based on the identified further subset of acceptable routes and acceptable modes.

2. The method of claim 1, wherein the at least one option is at least one of a type of car, a location to access bike share, a location to access car share, a bus line, and a route to the destination.

3. The method of claim 1, wherein determining the total weight may include applying a positive or negative weighting based on one or more of a determined time, distance and cost associated with traveling to the destination using the option of the acceptable modes.

4. The method of claim 3, wherein the positive or negative weighting is based on one or more of the preferences of the user, the history of the user, and the time and date.

5. The method of claim 3, wherein the positive or negative weighting is based on one or more of a location of the user, other installed client applications, event data from a calendar of the user, battery status of a phone of the user, a location of a home of the user, and a location of a car of the user.

6. The method of claim 3, wherein the positive or negative weighting is based on one or more of the time and date, weather data, local event data, crime data, and tourist data.

7. The method of claim 3, wherein the positive or negative weighting is based on one or both of a determined exercise weighting and a determined carbon footprint weighting.

8. The method of claim 3, wherein the positive or negative weighting is based on one or more of the determined time, the distance, and the cost associated with traveling to the destination using the option of the acceptable modes.

9. The method of claim 1, wherein the user device data comprises a number and/or type of applications installed on the user mobile device, a battery charge level associated with the user mobile device, and calendar data associated with the user.

10. The method of claim 1, further comprising:

determining a sequence for displaying the further subset of the acceptable modes to the user in order based on the total weight for each available mode.

11. The method of claim 1, wherein the safety data comprises one or more of crime data, daylight data, time of day data, and user age data.

12. A system for determining modes of transportation for display, the system including:
a data storage device storing instructions for providing determining modes of transportation for display;
a processor configured to execute the instructions to perform a method including:
receiving, for a user over an electronic network, log-in information, one or more transportation preferences and a destination;
identifying a subset of available modes of transportation to the destination;
determining one or more available routes associated with each of the subset of available modes of transportation to the destination;
determining a time, distance, and cost associated with traveling to the destination using the one or more available routes associated with each available mode;
determining a total weight for each of the one or more available routes associated with each available mode by comparing the determined time, distance and cost of the one or more available routes of each available mode against one or more of the preferences of the user, history of the user, or a date and time;
determining user device data locally available on a user mobile device associated with the user;
increasing or decreasing the total weight for each of the one or more available routes associated with each available mode by analyzing the user device data of the user mobile device;
determining safety data associated with each of the one or more available routes associated with each available mode;
increasing or decreasing the total weight for each of the one or more available routes associated with each available mode by analyzing the safety data;
identifying a further subset of acceptable routes and acceptable modes, the further subset of acceptable routes being a subset of the one or more available routes associated with each available mode and the further subset of acceptable modes being a subset of the subset of available modes, based on the determined total weight for each of the one or more available routes associated with each available mode; and
displaying, to the user, at least one option for traveling to the destination based on the identified further subset of acceptable routes and acceptable modes.

13. The system of claim 12, the processor executing the instructions to perform the method wherein the total weight for each available mode includes a positive or negative weighting based on one or more of the preference of the user, history of the user, the time and date, a location of the user, other installed client applications, event data from a calendar of the user, a battery status of a phone of the user, a location of a home of the user, a location of a car of the user, weather data, local event data, crime data, tourist data, determined exercise weighting, a determined carbon footprint weighting, a determined time, distance, and cost associated with traveling to the destination using the option of the acceptable modes.

14. The system of claim 12, the processor executing the instructions to perform the method further comprising:

determining a sequence for displaying the further subset of the acceptable modes to the user in order based on the total weight for each available mode.

15. A non-transitory computer readable medium storing instructions that, when executed by a computer, cause the computer to perform a method of determining modes of transportation for display, the method including:
- receiving, for a user over an electronic network, log-in information, one or more transportation preferences and a destination;
- identifying a subset of available modes of transportation to the destination;
- determining one or more available routes associated with each of the subset of available modes of transportation to the destination;
- determining a time, distance, and cost associated with traveling to the destination using the one or more available routes associated with each available mode;
- determining a total weight for each of the one or more available routes associated with each available mode by comparing the determined time, distance and cost of the one or more available routes of each available mode against one or more of preferences of the user, history of the user, or a date and time;
- determining user device data locally available on a user mobile device associated with the user;
- increasing or decreasing the total weight for each of the one or more available routes associated with each available mode by analyzing the user device data of the user mobile device;
- determining safety data associated with each of the one or more available routes associated with each available mode;
- increasing or decreasing the total weight for each of the one or more available routes associated with each available mode by analyzing the safety data;
- identifying a further subset of acceptable routes and acceptable modes, the further subset of acceptable routes being a subset of the one or more available routes associated with each available mode and the further subset of acceptable modes being a subset of the subset of available modes, based on the determined total weight for each of the one or more available routes associated with each available mode; and
- displaying, to the user, at least one option for traveling to the destination based on the identified further subset of acceptable routes and acceptable modes.

16. The non-transitory computer readable medium of claim 15, wherein the total weight for each available mode includes a positive or negative weighting based on one or more of the preference of the user, history of the user, the time and date, a location of the user, other installed client applications, event data from a calendar of the user, a battery status of a phone of the user, a location of a home of the user, a location of a car of the user, weather data, local event data, crime data, tourist data, determined exercise weighting, a determined carbon footprint weighting, a determined time, distance, and cost associated with traveling to the destination using the option of the acceptable modes.

17. The non-transitory computer readable medium of claim 15, the instructions causing the computer to further perform the method comprising:
- determining a sequence for displaying the further subset of the acceptable modes to the user in order based on the total weight for each available mode.

* * * * *